Nov. 10, 1970   H. L. CLARY   3,539,779
PERFORATED CARD CONTROLLED REGISTERING MACHINE
Filed May 16, 1968   3 Sheets-Sheet 3
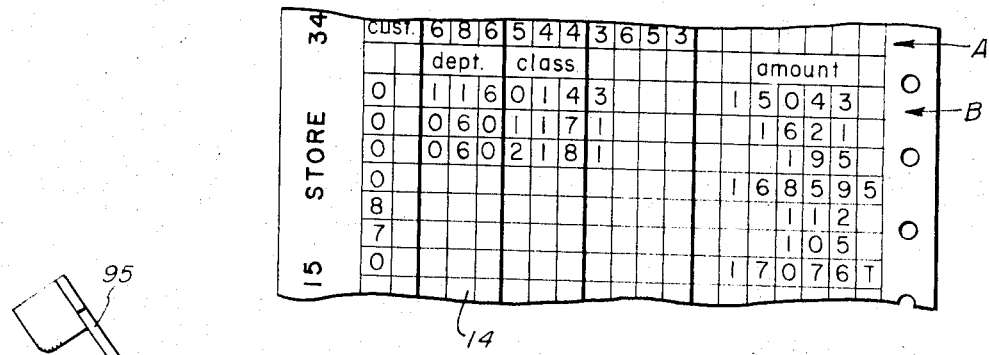
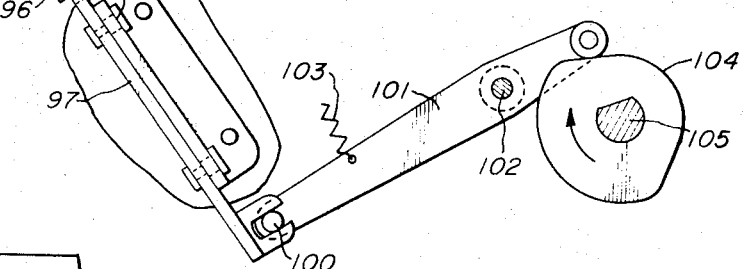
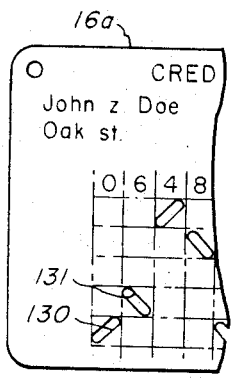
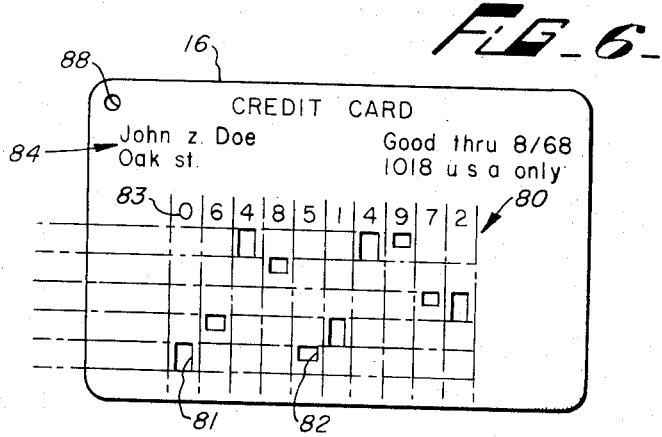
INVENTOR.
HUGH L. CLARY
BY
ATTORNEY.

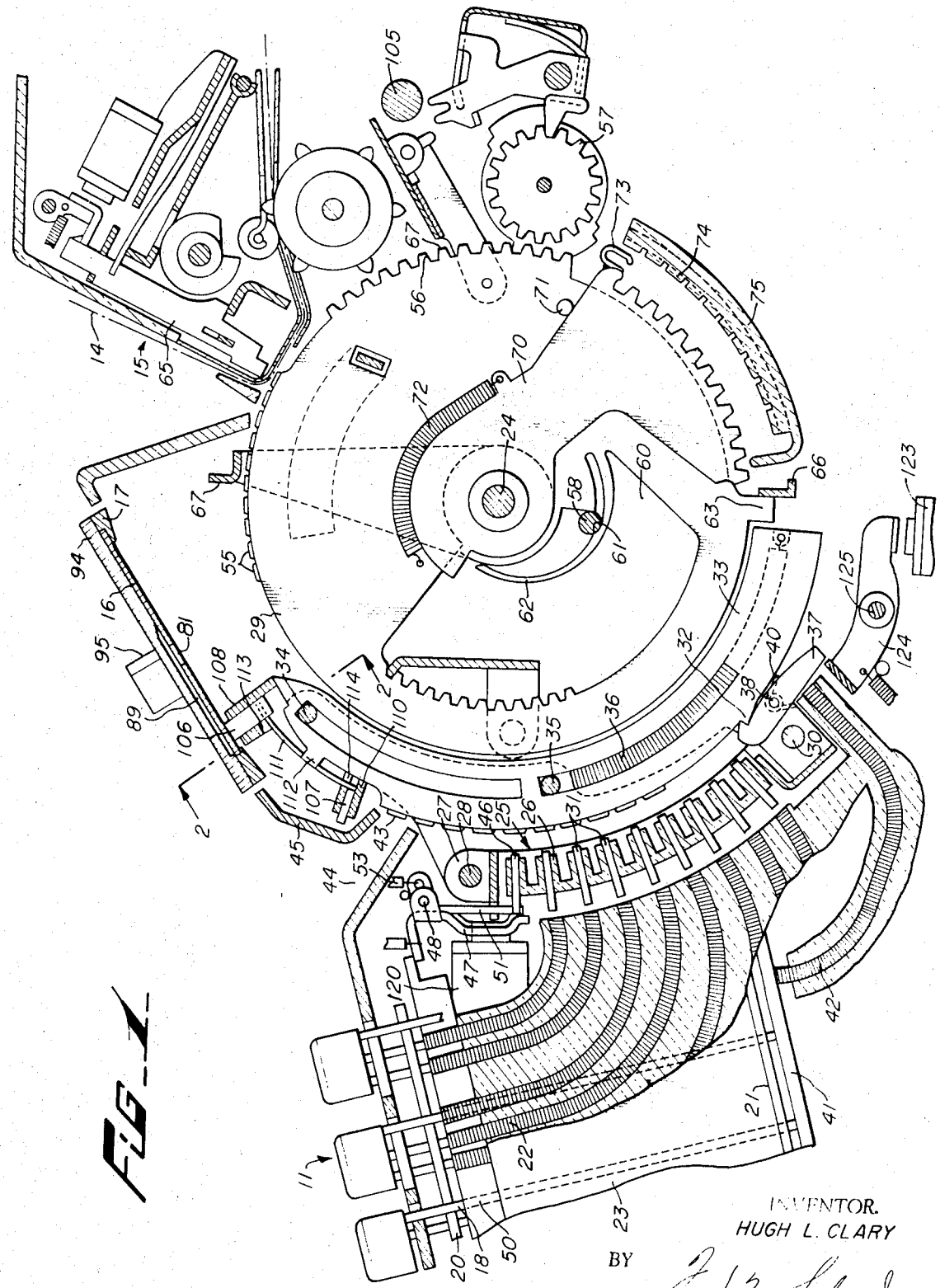

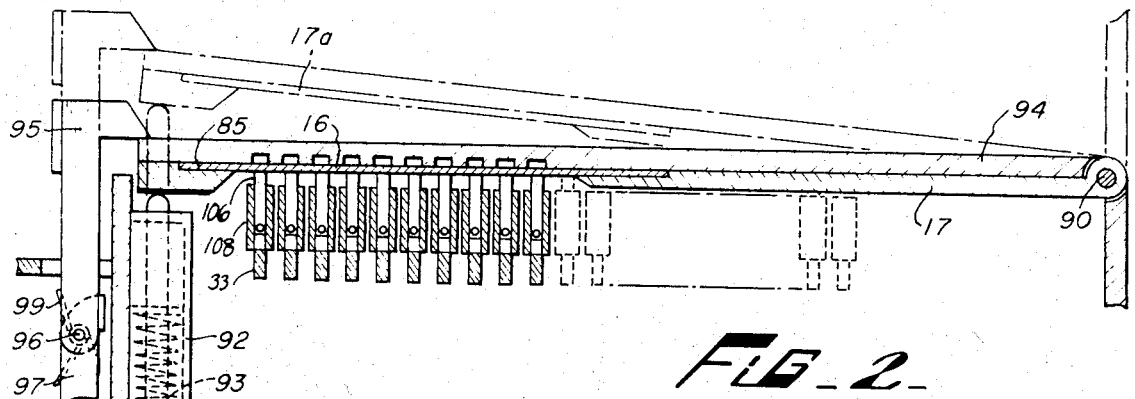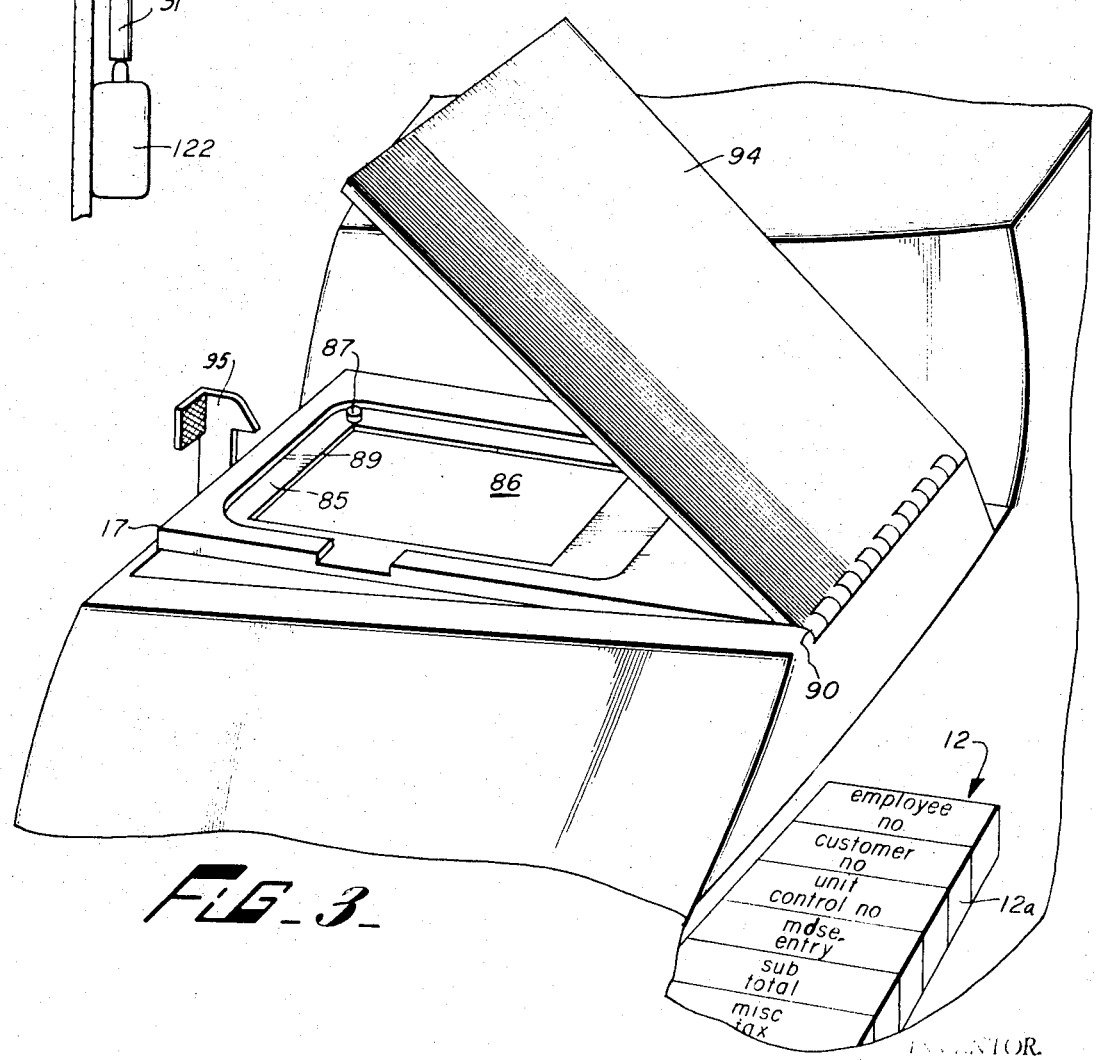

United States Patent Office 3,539,779
Patented Nov. 10, 1970

3,539,779
PERFORATED CARD CONTROLLED REGISTERING MACHINE
Hugh L. Clary, San Marino, Calif., assignor to Clary Corporation, San Gabriel, Calif., a corporation of California
Filed May 16, 1968, Ser. No. 729,744
Int. Cl. G06k 7/04
U.S. Cl. 235—61.11
11 Claims

ABSTRACT OF THE DISCLOSURE

A data registering and/or recording machine having members differentially movable to different positions to represent different digits and adapted to be controlled by a credit card or the like having a field of control perforations therein. Two different forms of perforations are provided which are effective to control respective ones only of two spaced feeler elements carried by each differentially movable member whereby to permit the size of the field of perforations to be reduced.

---

This invention relates to data registering machines, such as sales registers, data printers, data transmitters, etc., and has particular reference to machines capable of sensing data registered by perforated credit cards, employee tokens, merchandise price tokens, or the like.

Sales registering machines have been proposed heretofore for the purpose of registering various items pertaining to a sales transaction, such as the amount of sale, type of merchandising, taxes, employee's identification number, etc., and, in the case of a credit transaction, the identification number of the customer. Such machines generally include a keyboard on which amounts and identifying data may be entered and also include differentially movable members controlled by such keys and recording and accumulating mechanism controlled by the members.

Such machines enable registering and recording of various items of information at the point of sale where the information can be recorded on machine-readable media, such as punched tape, magnetic tape or the like. This greatly simplifies accounting procedures. For example, it obviates the need for manually entering the pertinent data more than once. One example of such a machine is disclosed and claimed in the Scozzafava et al. Pat. No. 3,017,081, issued on Jan. 16, 1962.

Because department stores, gasoline companies, etc. generally have a relatively large number of established credit customers, the identification numbers for such customers usually contain ten or more digits, making it somewhat inconvenient and time consuming to enter a customer's identification number by hand on the keyboard of a registering machine. Because of the extensive use of credit cards, it has been suggested that credit cards be formed to automatically control the differentially movable members of a registering machine, as by providing a field of control perforations in the cards. However, such credit cards are restricted in size in order to facilitate carrying the same in one's wallet or pocket and, in addition, certain information, such as the card holder's name and address, the creditor's name and address, and other identifying data must be provided, thereby further restricting the size of the field in which the control perforations or holes may be located in the card.

Accordingly, it is a principal object of the present invention to provide a data registering machine capable of being directly controlled by a credit card or the like of standard size.

Another object of the invention is to provide a machine of the above type capable of being controlled by a perforated card in which the field of control perforations is restricted in size.

Another object of the invention is to provide a machine of the above type having denominationally arranged differentially movable members capable of being directly controlled by a credit card or the like.

The manner in which the above and other objects of the invention are accomplished will be readily understood on reference to the following specification when read in conjunction with the accompanying drawings, wherein:

FIG. 1 is a longitudinal sectional view, with parts broken away, of a sales registering machine embodying the present invention.

FIG. 2 is a transverse sectional view taken along the line 2—2 of FIG. 1.

FIG. 3 is a perspective view of the credit card receptacle in open condition.

FIG. 4 is a facsimile of one form of sales check produced by the machine.

FIG. 5 is a sectional view illustrating the mechanism for lowering the credit card into controlling position.

FIG. 6 is a facsimile of a perforated credit card adapted to control the sales registering machine to enter the customer's identification number.

FIG. 7 is a facsimile of a modified form of credit card, partly broken away.

The sales registering machine disclosed herein embodies mechanism which is basically similar to that found in the well-known Addmaster adding machine and reference is hereby made to the R. E. Busch Pat. No. 3,113,719, issued on Dec. 10, 1963, and the H. L. Clary et al. Pat. No. 3,132,582, issued on May 12, 1964, for details of the basic Addmaster adding machine, not disclosed herein. Reference may also be had to the H. L. Clary et al. Pat. No. 3,350,005, issued on Oct. 31, 1967, for additional details of the sales registering machine which are not disclosed herein. Accordingly, for the sake of brevity, only those portions of the machine which relate to or form part of the present invention will be described in detail herein.

The machine includes a ten-key type keyboard 11 for entering such items as the department in which the items are purchased, the class of goods, the quantity of items sold, the customer's identification number, etc. A row 12 of machine function control keys is provided to cause the machine to print and/or register the employee number, customer number, unit control number, merchandise cost, etc., depending upon which key is depressed.

A series of interconnected paper forms, one of which is partly shown at 14 (FIG. 4), is provided, each form having preprinted lines and comprising vertical columns and horizontal rows. The forms are guided under a printer, generally indicated at 15, to imprint in adjacent columns the various items of information necessary to form a complete record of a sales transaction. Such information is also transferred to a suitable data recorder, not shown, such as a coded tape punch, which makes a machine-readable record of the transaction. A suitable tape punch for this purpose is disclosed in the aforementioned Scozzafava et al. Pat. No. 3,017,081.

KEYBOARD

Operation of the machine to print a customer's identification number is effected either by setting the identification number in the keys 11 or, in accordance with the present invention, by mounting a perforated credit card 16 (FIG. 6) in a credit card receptacle 17 and depressing the "Customer No." control key 12a, thereby causing a cycle of operation of the machine to print the customer's number in row A of the form 14.

The identification and amount of different items forming a sales transaction are printed in successive rows of the form, starting with row B. Here the department in which the goods is found and the class of goods are entered in sequence in the keys 11. The amount is entered in a separate keyboard (not shown), and the "MDSE. ENTRY" key in row 12 is depressed to cause the machine to cycle and print this data.

Other items, such as taxes, etc., can also be entered into the keys 11 and an appropriate control key depressed.

As disclosed in detail in the above Busch and Clary et al. patents, the keyboard 11 comprises ten amount keys ranging in value from 0 to 9. The keys are mounted on keystems 18 slideable vertically in slots provided in upper and lower key frames 20 and 21, respectively, forming part of the framework of the machine. Each keystem is attached to the upper end of a respective flexible cable 22. The various cables are vertically aligned with each other and are slideably mounted for endwise movement in curved grooves formed in a guide block 23 suitably fixed to the machine framework. The various cables 22 terminate in an arcuate pattern concentric with a shaft 24 which rotatably and independently supports a plurality of denominationally arranged printing sectors 29.

A pin carriage generally indicated at 25 is provided to receive entries from the keyboard. The pin carriage comprises an arcuate body 26 of plastic material mounted within an enclosing frame comprising side members 27 which are slideably mounted on transversely extending stationary rods 28 and 30. A spring, not shown, is provided to urge the pin carriage to the left (in FIG. 2) from a home position.

The pin carriage contains a series of vertical columns and horizontal rows of stop pins 31 which are slideably mounted therein for endwise movement from positions shown in FIG. 1 to positions wherein they are located in the paths of stop shoulders 32 formed on aligned arcuate stop slides 33. The latter are provided with arcuate guide slots slideable over guide rods 34 and 35 which are supported by the respective pin carriage side members 27. Each stop slide is urged clockwise from its illustrated position by a tension spring 36 extending between the slide and the guide rod 35 but is normally latched against such movement by a respective latch 37 pivotally supported on a rod 38 carried by the frame of the pin carriage. A torsion spring 40 normally holds each latch 37 in engagement with the stop shoulder 32.

Upon depression of any amount key 11 and consequent setting of a corresponding stop pin 31, the lower end of its keystem depresses a bail member 41 which is effective to actuate an additional flexible cable 42 also guided within a groove formed in the guide block. The cable 42, when actuated, rocks the aligned latch 37 to release the aligned stop slide 33, permitting it to move upward in a path concentric with the shaft 24 until its shoulder 32 strikes the set stop pin 31.

Each slide 33 carries a series of indicia 43 ranging in value from zero to nine. Such indicia are visible through a window opening 44 formed in a cover member 45 so that an amount entered into the keyboard and set up on the various slides 33 may be readily checked prior to operation of the machine.

The pin carriage includes an additional upper horizontal row of escapement pins 46 similar to the other stop pins. Such escapement pins are adapted to be engaged by a bail 47 pivotally supported at 48. The bail is engaged by a second universal bail 50 which underlies extensions on the keystems of the various keys so that depression of any key rocks the bails 50 and 47 to depress whichever escapement pin is aligned with the bail 47.

The leftmost escapement pin 46 of the pin carriage limits against a stop member 51 which is also pivoted at 48 but is normally held in blocking position by a spring 53. Thus, upon depression of any amount key in the keyboard 11 to set an appropriate stop pin 31 so as to locate a slide 33 in a corresponding position, an escapement pin 46 will be depressed beyond the stop member 51, permitting the pin carriage to escape one column to the left, wherein the next escapement pin 46 will arrest against the stop member 51.

PRINTING SECTORS AND DRIVE THEREFOR

The various differentially movable sectors 29 are independently mounted on the shaft 24 and each has a series of type characters 55 thereon ranging in value from zero to nine and cooperable with the printing mechanism 15 to imprint a selected type character on the form 14.

The sectors 29 also have gear teeth 56 thereon adapted to be meshed with an accumulator generally indicated at 57 whereby amounts entered into the machine may be accumulated.

The sectors 29 are yieldably driven clockwise from their home positions illustrated in FIG. 1 during digitizing and totalling operations of a machine cycle by a bail rod 58. The latter is swung in a clockwise and then counterclockwise path about the shaft 24 by a suitable means shown in the above Busch and Clary et al. patents during each cycle of the machine initiated by depression of any of the control keys in the row 12.

The bail rod 58 extends through openings 60 in the sectors and is normally engaged by a detent shoulder 61 formed on a yieldable tail 62 extending integrally from each sector. As the bail rod is rocked clockwise from its home position during the first portion of a cycle, it will correspondingly rock the sectors 29 until shoulders 63 thereon engage the lower ends of aligned slides 33 which have been previously set in different angular positions. At that time the tails 62 will yield, permitting the bail rod to proceed to the limit of its clockwise excursion. Thereafter, and during the printing phase, hammers 65 forming part of the printing mechanism 15 will be spring impelled downwardly to imprint a form 14 against aligned type characters 55.

After the printing phase of a machine cycle, the bail rod 58 is returned counterclockwise and in doing so it will return the various sectors 29 to their home positions where they will arrest against a transverse bar 66. Subsequently, a restore bail 67 pivotally supported on the shaft 24 will be rocked counterclockwise to return the various slides 33 to their home positions where they will be held by their respective latches 37.

In order to transfer data from the sectors 29 to the aforementioned data recorder, a brush arm 70 is pivotally supported adjacent each sector for movement about the shaft 24. Each arm is normally held against a pin 71 on its associated sector by a spring 72 tensioned between the arm and the sector. An electrical contact brush 73 is carried by the arm 70 and is adapted to complete a circuit through one of a series of ten bus conductors 74 extending across the machine, depending on the position to which the sector is advanced. The conductors 74 are connected to the data recorder in a manner similar to the connections of conductors 414 of the aforementioned Scozzafava et al. patent.

The conductors 74 are carried by an arcuate plate 75 which is moved upwardly to contact certain of the conductors with the brushes 73 just prior to the printing phase of the machine cycle.

According to the present invention, each credit card, i.e. 16, FIG. 6, is provided with a field 80 of control perforations. Such perforations are located in various denominationally arranged vertical columns and in any of five horizontal rows, depending upon the digital representations of the perforations. It will be noted that the perforations are rectangular and of two different sizes, the larger sizes, i.e. 81, representing by their positions in different ones of the horizontal rows, the digits zero to four, counting from the bottom row, and the smaller size perforations, i.e. 82, representing by their positions in the different horizontal rows, the digits five to nine, also counting from the bottom row. Only one perforation is provided in each column.

The customer's identification number is also indicated in embossed digits 83 located in a row directly above the field 80. Other information, such as the card holder's name, address, etc., 84, is embossed on the card along with the other various information such as the creditor's name necessary for identification, etc.

In order to use a credit card 16 to automatically enter the customer's identification number into the machine, the card is fitted within a recess 85 in the receptacle 17 and laid over a flange 89 defining an opening 86. A locating stud 87 is mounted on the flange 85 to receive an opening 88 in the card to thus insure that the card is properly oriented.

The receptacle 17 is pivotally supported at 90 and is normally held in a raised position by a plunger 91 slideably mounted in a guide housing 92 and urged upwardly by a compression spring 93. A cover member 94 is also pivotally supported at 90 independently of the receptacle and is intended to be swung downwardly to hold the credit card in place.

When it is desired to record a customer's number, his credit card is inserted in the receptacle and the cover member 94 is pressed downward, forcing the receptacle into its dot-dash line position 17a shown in FIG. 2 where it is held by a latch 95. The latter is pivotally supported at 96 by a slide 97 and yieldably held in its illustrated upright position by a torsion spring 99. The slide 97 is guided for vertical movement by guide studs 98 (FIG. 5) which are embraced by suitable guide slots in the slide. The slide 97 is connected through a pin-and-slot coupling 100 to a cam follower 101 which is fulcrumed at 102 and held by a spring 103 in cooperative engagement with a cam 104 mounted on a cyclic drive shaft 105.

Prior to initiation of a machine cycle, an electromagnet 120 is energized to release the stop member 51 from engagement with the pins 46 and permitting the pin carriage to be moved to its lefthand position wherein the slides 33 are aligned with respective ones of the sectors 29. Thereafter, upon initiation of a machine cycle and before the sectors 29 are rotated clockwise, the receptacle 17 is drawn down to its full line position of FIGS. 1 and 2 by the cam 104, thus locating the card 16 in position to be sensed by pairs of feeler pins 106 and 107 slideably mounted in respective tubular guide bosses 108 and 110 formed integrally with the slide members 33. A wire spring 111 is attached at opposite ends to the feelers of each pair and is stressed over a bridge 112 so as to urge the feelers outwardly. The spring 111 is also guided in slots 113 and 114.

The feeler 106 is relatively wide as measured in the direction of movement of the slide 33 and it is therefore capable of entering only into a larger perforation 81 in an aligned column of the card, whereas the feeler 107 is capable of entering into a smaller perforation 82. The feelers 106 and 107 are spaced apart a distance equal to the spacing between the upper and lower rows of perforations plus the spacing between two adjacent rows so that if the feeler 106 does not enter a perforation 81 during its traverse of a column of the card, the feeler 107 will enter a smaller perforation in the same column and thus arrest the slide 33 in an appropriate digital position.

It will be noted that the cover member 94 is provided with grooves 89 directly overlying the paths of the sensing members 106 and 107 so that such members may extend into the grooves when they enter the perforations.

Prior to insertion of the credit card into the receptacle 17, or at least prior to operation of the machine, an electromagnet 120 is energized to withdraw the stop member 51, allowing the pin carriage to be moved leftward by its spring to the limit of its travel so as to align the various slides 33 with the sectors 29. Now, upon operation of the machine, the plunger 91 is lowered into its position shown in full lines in FIG. 2 to close a normally open switch 122 located in the power circuit for an electromagnet 123 causing energization of the latter to swing a bail 124 clockwise about its pivot support 125.

The bail 124 extends across all of the latches 37 when the pin carriage is in its leftmost position and is thus effective to release the slides 33, permitting them to move clockwise until arrested by engagement of the feelers 106 and 107 with perforations in the corresponding columns of the credit card.

Subsequently, the sectors 29 are advanced until arrested by the slides 33.

After the printing phase and before the slides 33 are returned to their home positions, the cam 104 permits the receptacle to be raised to remove the card 16 from cooperative engagement with the various feelers 106 and 107.

The card 16 may be removed from the receptacle by manually rocking the latch 95 outward and then raising the cover member 94 to gain access to the card.

From the foregoing description, it will be noted that the size of the field of perforations may be reduced to only a fraction of the size of the credit card, leaving the remaining area for other necessary indicia.

FIG. 7 illustrates a modified form of credit card 16a wherein two different types of perforations 130 and 131 are provided, the former representing the digits zero to four, depending on their locations in the five horizontal rows and the latter representing the digits five to nine, also depending upon their locations. In this case, the feelers (not shown), similar to the feelers 106 and 107 would be so shaped that the feeler corresponding to feeler 106 would be received only by the perforations 130 while the feelers similar to 107 would have a shape such that they would be received only by the perforations 131. It is evident that other shapes and/or sizes of perforations and corresponding feelers could be employed.

It is to be noted that appropriately perforated employee tokens or cards, merchandise price cards or the like could also be utilized to automatically control the machine to record and/or register various pertinent data. It should also be apparent that the printing sectors 29 could be directly controlled by perforated credit cards of the above type in which case the feeler members, i.e. 106 and 107, would be caried directly by such sectors.

Having thus described the invention, what is desired to be secured by United States Letters Patent is:

1. In a record sensing machine,
 the combination comprising a record card having a plurality of columns of perforations,
 certain of said perforations representing different digits by the positions of said perforations along said columns,
 certain others of said perforations being of a different shape than said first mentioned perforations and representing different other digits by the positions of said other perforations along said columns,
 denominationally arranged members differentially movable into different positions to represent different respective ones of said digtis
 means for yieldably advancing said differentially movable members,
 a pair of perforation sensing members operatively connected to each of said differentially movable members and movable seriatim along respective ones of said columns of perforations, and
 a first of each said pair of sensing members being effective to sense only said first mentioned perforations.

2. The combination according to claim 1 wherein said sensing members are carried by said differentially movable members and are spaced therealong.

3. The combination according to claim 1 comprising means for advancing and retracting said differentially movable members, and
 means for maintaining said sensing members in cooperative relation with said record card during advancement of said sensing members and for maintaining said sensing members out of cooperative relation with said record card during retraction of said sensing members.

4. The combination according to claim 1 wherein the second of each of said pair of sensing members is effective to sense only certain others of said perforations.

5. The combination according to claim 1 comprising printing means controlled by said differentially movable members.

6. The combination according to claim 1 comprising a receptacle for said record card,
cyclically operable means for advancing and retracting said differential members,
means for maintaining said receptacle in a position to maintain said record card in cooperative relation with said sensing members during advancement of said differentially movable members and for maintaining said record card out of cooperative relation with said sensing members during retraction of said differentially movable members.

7. The combination according to claim 1 wherein said first sensing members are effective to enter only said first mentioned perforations.

8. The combination according to claim 2 comprising means for supporting said record card in a flat plane, and
said differentially movable members being movable in an arc whereby to carry said sensing members in an arc extending substantially tangent to the plane of said record card.

9. The combination according to claim 2 wherein said differentially movable members support said sensing members for movement to and from the surface of said record card, and
spring means for urging said sensing members toward sliding engagement with said card.

10. The combination according to claim 1 comprising a receptacle for said record card,
cyclically operable means for advancing and retracting said differential members, and
means for maintaining said receptacle in a position to maintain said record card in cooperative relation with said sensing members during advancement of said differential members and for maintaining said record card out of cooperative relation with said sensing members during retraction of said differentially movable members.

11. In a record sensing machine,
the combination comprising,
a record card having a plurality of columns of perforations,
certain of said perforations representing different digits by the positions of said perforations along said columns,
certain others of said perforations being of a different shape than said first mentioned perforations and representing different other digits by the positions of said other perforations along said columns,
denominationally arranged members differentially movable in arcs about a common axis into different positions to represent different respective ones of said digits,
means for advancing and retracting said differentially movable members,
a pair of sensing members carried by each of said differentially movable members for movement toward and away from the surface of said record card,
spring means for urging said sensing members toward sliding engagement with said card,
said sensing members being spaced along the length of said differential members,
the leading one of said sensing members being effective to enter only into said first mentioned perforations,
means for maintaining said card in a flat plane, and
means for locating said card in the paths of said sensing members during advancement of said differentially movable members and for locating said card out of the paths of said sensing members during retraction of said differentially movable members.

References Cited

UNITED STATES PATENTS

| | | | |
|---|---|---|---|
| 2,169,213 | 8/1939 | Bächdahl | 235—61.112 XR |
| 2,638,270 | 5/1953 | Jones | 235—61.112 XR |
| 2,673,033 | 3/1954 | Gruver | 235—61.112 XR |

MAYNARD R. WILBUR, Primary Examiner

W. W. COCHRAN II, Assistant Examiner

U.S. Cl. X.R.

235—61.9